(12) United States Patent
Metcalf

(10) Patent No.: US 10,807,311 B2
(45) Date of Patent: Oct. 20, 2020

(54) ADDITIVE MANUFACTURING DEVICE WITH IR TARGETING AND RELATED METHODS

(71) Applicant: Rebecca Metcalf, Chapel Hill, NC (US)

(72) Inventor: Rebecca Metcalf, Chapel Hill, NC (US)

(*) Notice: Subject to any disclaimer, the term of this patent is extended or adjusted under 35 U.S.C. 154(b) by 253 days.

(21) Appl. No.: 16/126,005

(22) Filed: Sep. 10, 2018

(65) Prior Publication Data

US 2020/0079023 A1    Mar. 12, 2020

(51) Int. Cl.

| B29C 64/393 | (2017.01) |
|---|---|
| B33Y 10/00 | (2015.01) |
| B33Y 30/00 | (2015.01) |
| B33Y 50/02 | (2015.01) |
| B28B 17/00 | (2006.01) |
| B29C 64/10 | (2017.01) |
| B29C 64/20 | (2017.01) |
| B28B 1/00 | (2006.01) |
| B22F 3/00 | (2006.01) |

(52) U.S. Cl.
CPC ............ B29C 64/393 (2017.08); B22F 3/008 (2013.01); B28B 1/001 (2013.01); B28B 17/0081 (2013.01); B29C 64/10 (2017.08); B29C 64/20 (2017.08); B33Y 10/00 (2014.12); B33Y 30/00 (2014.12); B33Y 50/02 (2014.12)

(58) Field of Classification Search
None
See application file for complete search history.

(56) References Cited

U.S. PATENT DOCUMENTS

| 5,019,855 | A | 5/1991 | Lam |
|---|---|---|---|
| 5,948,289 | A | 9/1999 | Noda et al. |
| 6,165,406 | A | 12/2000 | Jang et al. |
| 6,204,875 | B1 | 3/2001 | De Loor et al. |
| 7,146,236 | B2 | 12/2006 | Silverbrook |
| 7,548,360 | B2 | 6/2009 | Brotherton-Ratcliffe et al. |
| 7,646,544 | B2 | 1/2010 | Batchko et al. |
| 7,738,733 | B2 | 6/2010 | DePue et al. |
| 7,778,723 | B2 | 8/2010 | Cregger |
| 8,036,448 | B2 | 10/2011 | Gildenberg |
| 9,764,514 | B2 | 9/2017 | Albert et al. |
| 9,808,992 | B1 | 11/2017 | Linnell et al. |
| 9,868,254 | B2 | 1/2018 | Stahl et al. |
| 9,908,288 | B2 | 3/2018 | Harkness et al. |
| 9,910,935 | B2 | 3/2018 | Golway et al. |
| 9,914,292 | B2 | 3/2018 | Yakubov et al. |
| 2002/0048396 | A1 | 4/2002 | Bewley, Jr. et al. |

(Continued)

*Primary Examiner* — Peter L Vajda
*Assistant Examiner* — Paul Spiel
(74) *Attorney, Agent, or Firm* — Allen, Dyer, Doppelt + Gilchrist, PA

(57) ABSTRACT

An additive manufacturing device may include a material supply, a robot, and a printing head coupled to a distal end of the robot and configured to receive printing material from the material supply. The additive manufacturing device may have an IR holographic device configured to generate a targeting hologram, an IR sensor, and a controller coupled to the robot, the printing head, the IR holographic device, and the IR sensor. The controller may be configured to cause the printing head to dispense the printing material to form an object based upon the targeting hologram.

20 Claims, 5 Drawing Sheets

(56) References Cited

U.S. PATENT DOCUMENTS

| | | |
|---|---|---|
| 2003/0179452 A1 | 9/2003 | Lizotte |
| 2004/0223385 A1 | 11/2004 | Fleming et al. |
| 2005/0156481 A1 | 7/2005 | Zhou et al. |
| 2006/0065640 A1 | 3/2006 | Lizotte et al. |
| 2007/0087284 A1 | 4/2007 | Fleming et al. |
| 2009/0230269 A1 | 9/2009 | Dallarosa |
| 2015/0064299 A1 | 3/2015 | Koreis |
| 2015/0165681 A1 | 6/2015 | Fish et al. |
| 2015/0220291 A1 | 8/2015 | Tapley et al. |
| 2015/0273757 A1 | 10/2015 | Pforte et al. |
| 2015/0309473 A1 | 10/2015 | Spadaccini et al. |
| 2015/0375453 A1 | 12/2015 | Yost et al. |
| 2016/0021925 A1 | 1/2016 | Holman et al. |
| 2016/0107391 A1 | 4/2016 | Parish et al. |
| 2016/0144433 A1 | 5/2016 | Stoffel |
| 2016/0229120 A1 | 8/2016 | Levine et al. |
| 2016/0243649 A1 | 8/2016 | Zheng et al. |
| 2016/0271870 A1 | 9/2016 | Brown, Jr. |
| 2016/0271875 A1 | 9/2016 | Brown, Jr. |
| 2017/0090460 A1 | 3/2017 | Andrew et al. |
| 2017/0091411 A1 | 3/2017 | Schoenecker et al. |
| 2017/0136692 A1 | 5/2017 | Zheng et al. |
| 2017/0210072 A1 | 7/2017 | Rodriguez et al. |
| 2017/0259502 A1 | 9/2017 | Chapiro et al. |
| 2017/0298580 A1 | 10/2017 | Flitsch et al. |
| 2017/0334144 A1 | 11/2017 | Fish et al. |
| 2017/0348872 A1 | 12/2017 | Suzuki et al. |
| 2017/0348896 A1 | 12/2017 | Wabnig et al. |
| 2018/0015672 A1 | 1/2018 | Shusteff et al. |
| 2018/0056603 A1 | 3/2018 | Hensleigh et al. |
| 2018/0099453 A1 | 4/2018 | Cambron |
| 2018/0126663 A1 | 5/2018 | Jun et al. |
| 2018/0143147 A1 | 5/2018 | Milner et al. |
| 2018/0290397 A1* | 10/2018 | Yu .................. G02B 30/56 |

* cited by examiner

ADDITIVE MANUFACTURING DEVICE WITH IR TARGETING AND RELATED METHODS

TECHNICAL FIELD

The present disclosure relates to the field of manufacturing, and, more particularly, to additive manufacturing devices and related methods.

BACKGROUND

Custom manufacturing or prototyping has typically been an expensive and labor-intensive task. Indeed, in early approaches, it was not uncommon to shave solid wood blocks to prototype model devices. Later, some approaches included starting with solid metal ingots and machining or milling the ingot into the desired object. Again, this approach was quite labor-intensive and also expensive.

With the advent of three-dimensional (3D) printing, or additive manufacturing, rapid prototyping was now possible. In this approach, thin layers of material are printed one layer at a time to complete the object. The printing process is driven by a 3D digital file, for example, a computer-aided design (CAD) file.

SUMMARY

Generally, an additive manufacturing device may include a material supply, a robot, and a printing head coupled to a distal end of the robot and configured to receive printing material from the material supply. The additive manufacturing device may comprise an infrared (IR) holographic device configured to generate a targeting hologram, an IR sensor, and a controller coupled to the robot, the printing head, the IR holographic device, and the IR sensor. The controller may be configured to cause the printing head to dispense the printing material to form an object based upon the targeting hologram.

In particular, the controller may be configured to cause the printing head to trace the targeting hologram. The IR holographic device may comprise at least one holographic plate, and an IR source configured to emit IR radiation through the at least one holographic plate to generate the targeting hologram.

In some embodiments, the at least one holographic plate may comprise a plurality of holographic plates, and the IR source may be configured to emit the IR radiation through a given holographic plate to generate a given layer of the targeting hologram, the targeting hologram comprising a plurality of layers. The IR source may comprise an IR laser source, for example.

Moreover, the printing material may comprise IR reflective pigment. The controller may be configured to cause the printing head to trace the targeting hologram in a layer-by-layer fashion. The controller may be configured to cause the printing head to trace the targeting hologram from a bottom layer upward. The targeting hologram may represent a three-dimensional model of the object.

Another aspect is directed to a method for operating an additive manufacturing device. The additive manufacturing device may include a material supply, a robot, a printing head coupled to a distal end of the robot and configured to receive printing material from the material supply, an IR holographic device configured to generate a targeting hologram, an IR sensor, and a controller coupled to the robot, the printing head, the IR holographic device, and the IR sensor. The method may include causing the printing head to dispense the printing material to form an object based upon the targeting hologram.

DETAILED DESCRIPTION

Figure 1:
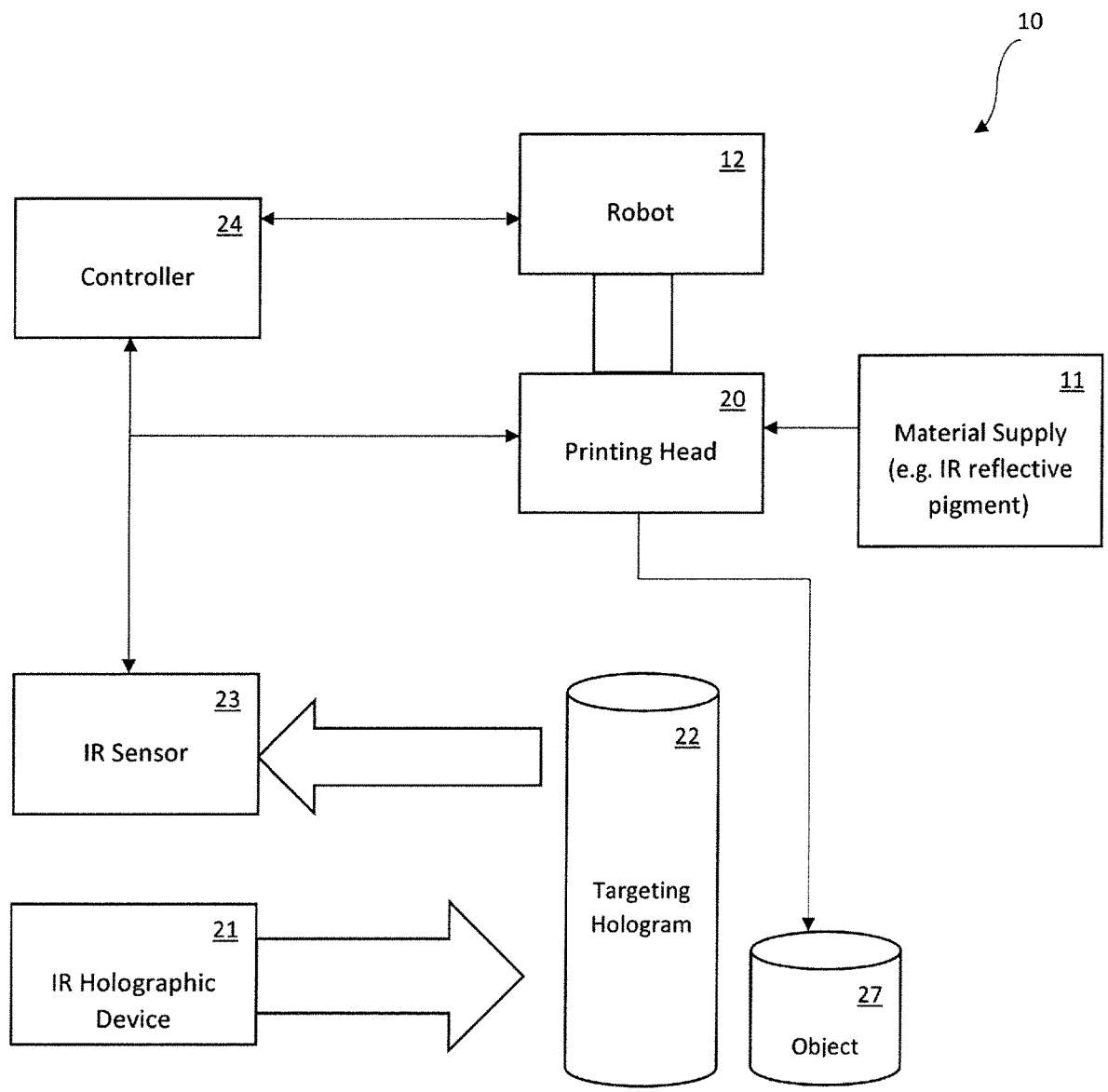
FIG. 1 is a schematic diagram of an additive manufacturing device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2A:
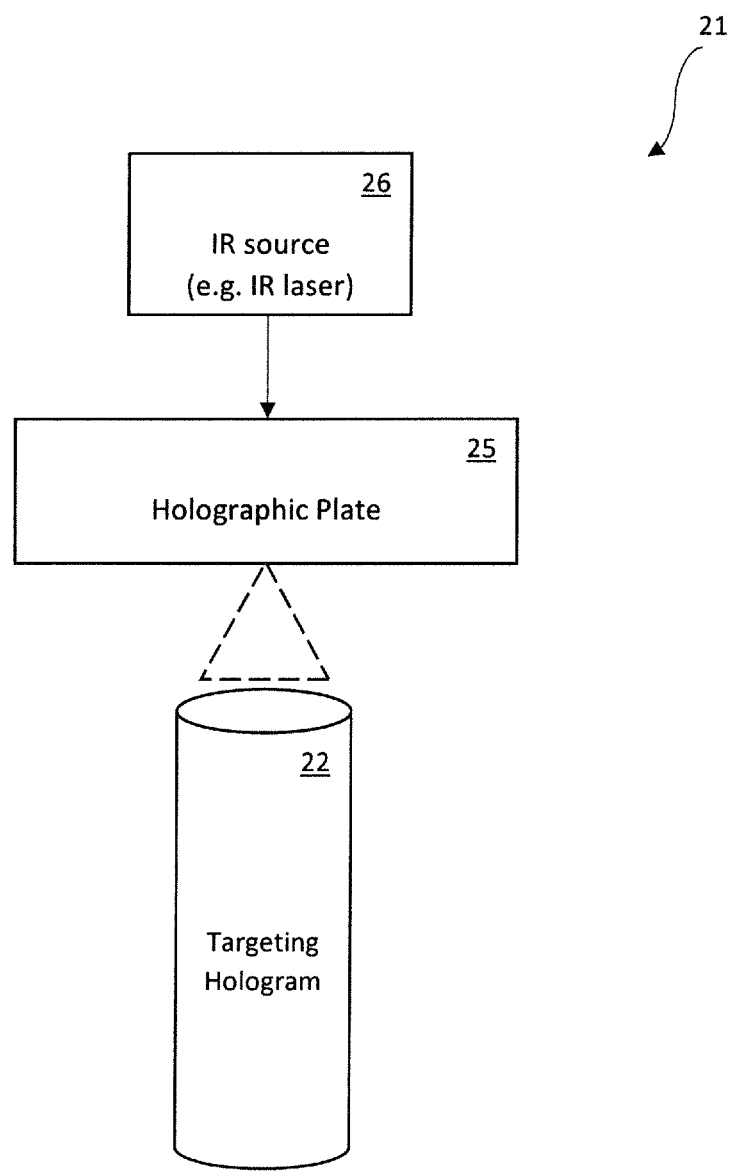
FIGS. 2A-2B are schematic diagrams of first and second example embodiments of the IR holographic device from the additive manufacturing device of FIG. 1.
Figure 3:
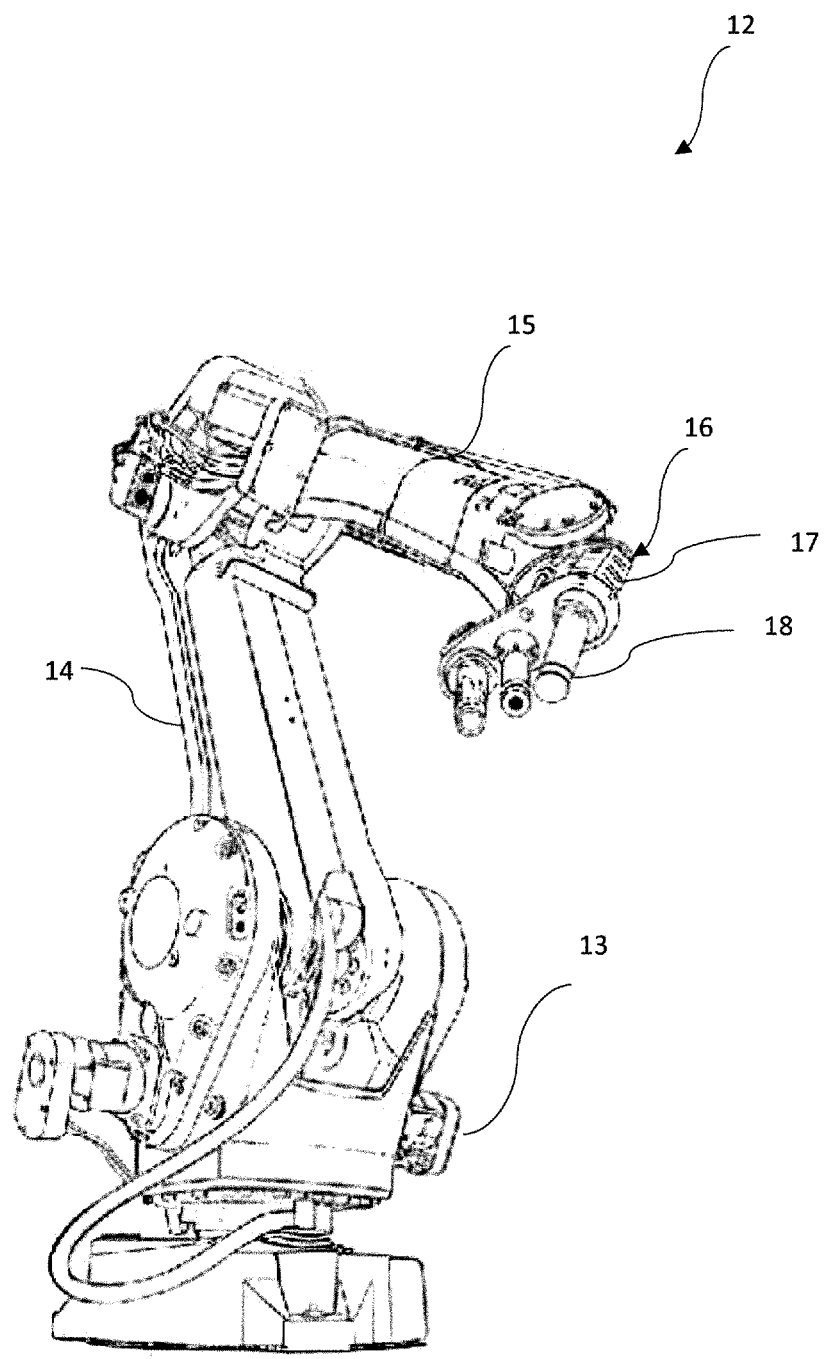
FIG. 3 is a schematic perspective view of an example embodiment of the robot from the additive manufacturing device of FIG. 1.

Referring initially to FIGS. 1, 2A, & 3, an additive manufacturing device 10 according to the present disclosure is now described. The additive manufacturing device 10 illustratively includes a material supply 11, and a robot 12. The material supply 11 may comprise a spool of polymer plastic material, a resin material supply, a spool of metallic material, an oil resin material supply, or a clay material supply.

In the illustrative example of FIG. 3, the robot 12 has a robotic arm form factor and includes a motor 13, a plurality of linking arms 14, 15 coupled to the motor, and a wrist portion 16 coupled to the plurality of linking arms. Each wrist portion 16 illustratively includes a base portion 17, and a fully articulating hand portion 18 (i.e. a multi-axis articulating motion) coupled to the base portion and capable of moving in three-axes and rotating. For example, the robot 12 may be a modified version of the M-1iA model robot, as available from the FANUC Robotics America Corporation of Rochester Hills, Mich.

The additive manufacturing device 10 illustratively includes a printing head 20 coupled to a distal end (e.g. the fully articulating hand portion 18) of the robot 12 and configured to receive printing material from the material supply 11. The printing head 20 may comprise a nozzle for dispensing the printing material. Depending on the material being used, the nozzle may be interchangeable. For example, for clay based materials, the nozzle would need to prevent air bubbles from forming in the printed material.

The additive manufacturing device 10 illustratively includes an IR holographic device 21 configured to generate a targeting hologram 22, an IR sensor 23, and a controller 24 coupled to the robot 12, the printing head 20, the IR holographic device, and the IR sensor. The targeting hologram 22 may represent a three-dimensional model of an object 27 to be manufactured/printed.

The controller 24 is configured to cause the printing head 20 to dispense the printing material to form the object 27 based upon the targeting hologram 22. As will be appreciated by those skilled in the art, the controller 24 comprises hardware processing circuitry, such as a processor and memory associated therewith. In some embodiments, the controller 24 comprises an Arduino UNO microcontroller, or a Raspberry Pi microcontroller. Also, the controller 24 may manage the manufacturing process using software stored therein, such as Octoprint, an open source software project available from GitHub, Inc. of San Francisco, Calif.

Of course, the robot 12 may comprise other robot form factors. Nevertheless, the robot 12 would need to have sufficient articulation to avoid creating shadowing in the targeting hologram 22.

In particular, the controller 24 is configured to cause the printing head 20 to trace the targeting hologram 22. The controller 24 is configured to cause the printing head 20 to trace the targeting hologram 22 in a layer-by-layer fashion. In particular, the controller 24 is configured to cause the printing head 20 to trace the targeting hologram 22 from a bottom layer upward while concurrent dispensing the material, printing one layer on top of another. In some embodiments, for each layer, the controller 24 is configured to cause the printing head 20 to trace the targeting hologram 22 from periphery inward, thereby forming material outside first and subsequently working inward. In other embodiments, for each layer, the controller 24 is configured to cause the printing head 20 to trace the targeting hologram 22 from a medial or center portion outward, thereby forming material inside first and subsequently working outward.

The IR holographic device 21 illustratively includes a holographic plate 25 (e.g. a PFG-03M 2.5×2.5 inch film plate), and an IR source 26 configured to emit IR radiation through the holographic plate to generate the targeting hologram 22. The IR source 26 may comprise an IR laser source, for example.

Moreover, in some embodiments, the printing material may comprise IR reflective pigment. The IR reflective pigment may comprise, for example, Lumogen 40P925, as available from BASF SE of Ludwigshafen, Germany.

Advantageously, during the printing process, the IR reflective pigment may prevent undesired softening in the object 27 from the targeting hologram 22. In other words, the pigment reduces IR absorption in the object 27.

In some embodiments, the robot 12 includes a touch sensor configured to monitor a state of printing for the object 27. The controller 24 is coupled to the touch sensor and verifies the object 27 is actually be printed, i.e. a quality control check.

Although not shown, the additive manufacturing device 10 comprises a base for printing the object 27. The base may comprise a glass material.

Also, the robot 12 is configured to operate without intruding between the IR source and the holographic plate, which would block the targeting hologram. In other words, the robotic arm is blocked from certain areas, and this may be accomplished via programming in the controller 24. In other embodiments, physical stops could be inserted into the robot to prevent intrusion in these certain areas.

Another aspect is directed to a method for operating an additive manufacturing device 10. The additive manufacturing device 10 includes a material supply 11, a robot 12, a printing head 20 coupled to a distal end of the robot and configured to receive printing material from the material supply, an IR holographic device 21 configured to generate a targeting hologram 22, an IR sensor 23, and a controller 24 coupled to the robot, the printing head, the IR holographic device, and the IR sensor. The method includes causing the printing head 20 to dispense the printing material to form an object 27 based upon the targeting hologram 22.

Figure 2B:
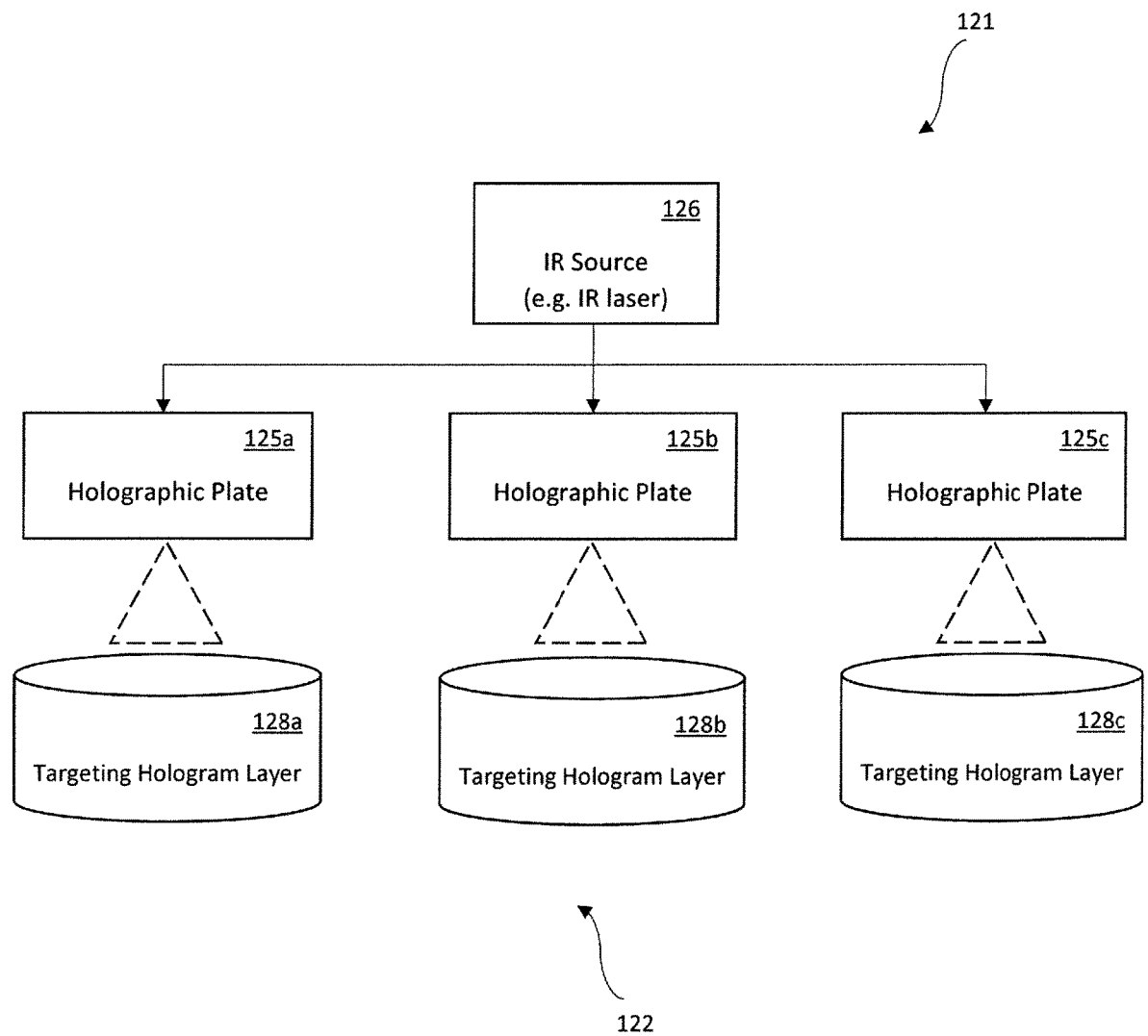

Referring now additionally to FIG. 2B, another embodiment of the IR holographic device 121 is now described. In this embodiment of the IR holographic device 121, those elements already discussed above with respect to FIG. 2B are incremented by 100 and most require no further discussion herein. This embodiment differs from the previous embodiment in that this IR holographic device 121 illustratively includes a plurality of holographic plates 125a-125c. The IR source 126 is configured to emit the IR radiation through a given holographic plate to generate a given layer 128a-128c of the targeting hologram 122. The targeting hologram 122 illustratively includes a plurality of layers 128a-128c. This embodiment may be used for applications where the object 127 (not shown) to be printed is complicated.

In some embodiments, each of the plurality of layers 128a-128c is generated sequentially, and therefore printed sequentially. In these embodiments, the user would need to swap out the holographic plates 125a-125c (using a plate optical stand for proper positioning) in a proper order to form the object 127. For example, the first holographic plate 125a would represent the bottommost layer of the object 127.

In other embodiments, all of the plurality of layers 128a-128c are generated concurrently, thereby forming a complete targeting hologram 122. In concurrent embodiments, the IR source 126 would be combined with a beam splitter to permit a corresponding plurality of source beams to impact the plurality of holographic plates 125a-125c.

Figure 4:
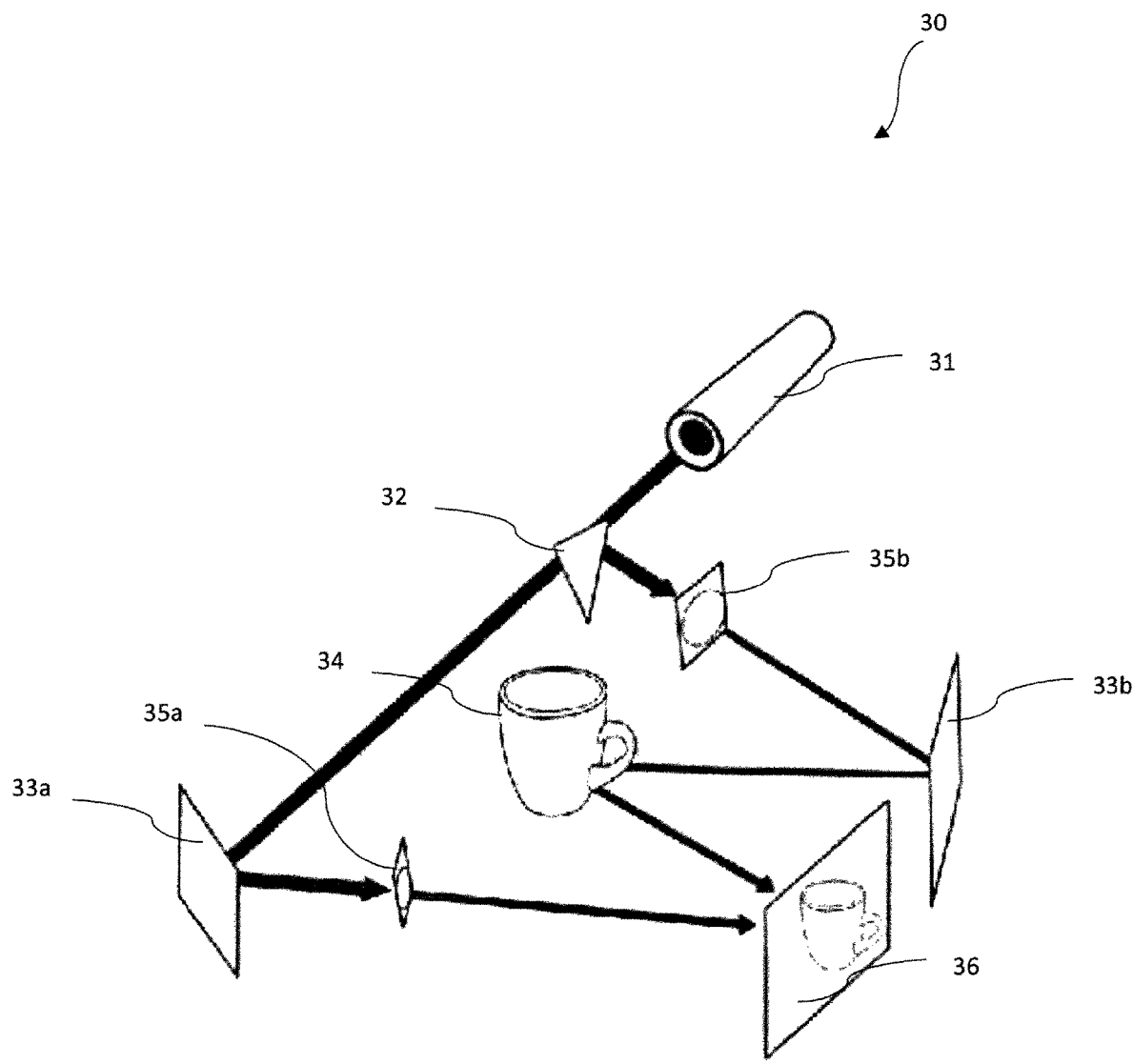
FIG. 4 is a schematic diagram of an example embodiment of a system to form the holographic plates from FIGS. 2A and 2B.

Referring now to FIG. 4, a system 30 to generate the holographic plates 25, 125a-125b from the above embodiments is now described. The system 30 illustratively includes an optical source 31 (e.g. laser light source, helium-neon (HeNe) laser), and a beam splitter 32 configured to split a coherent light beam from the optical source into first and second optical signals. The system 30 illustratively includes a first mirror 33a configured to reflect the first optical signal, an optical element 35a (e.g. a diverging lens) passing the first optical signal, and a holographic plate 36 configured to receive the first optical signal, which serves as a reference beam. The system 30 illustratively includes an optical element 35b (e.g. a diverging lens) configured to pass the second optical signal, a second mirror 33b configured to reflect the second optical signal toward an object 34, and a holographic plate 36 configured to receive the second optical signal reflected from the object, which serves as an object beam.

In the following, an exemplary discussion of additive manufacturing device 10 discussed herein.

Advantages of the multi-axis robotic 3D printer are that it traces IR light, which makes preparation and printing significantly faster than most traditional 3D printers. This printing robot traces the IR light of a transmission hologram while simultaneously printing or it prints layer-by-layer tracing an IR light pattern that shines through a laser cut metal template while extruding plastic or viscous material precisely where the IR light is located.

In some embodiments, the holographic plate comprises a metal plate. The metal template is laser cut guided by computer software and the computer generated image layers, which are cut into templates can be transferred to the laser cutter. In front of the template is a projector lens to adjust the IR light projection to the size desired.

IR reflective pigment could be added to the plastic if IR heat absorption overly softens the extruded plastic. Liquid glass, a silica mixture could be used, which can print from 3D printers without needing heating to extrude it and IR light hardens the plastic to be like acrylic glass, then the finished product is heated to about 2,372° F. burning away the plastic and fusing the silica into a smooth glass while keeping the desired shape.

The viscous material (i.e. the material supply 11) could also be many other things, such as clay such, as for pottery or metallic clay, or wax, or food such as marzipan or fondant, or artist's oil stick paint for digital painting with real paint on canvas, or other viscous materials could be printed as well. If paint is being extruded, then each layer would be a separate color of paint and the painting would be separated on computer into layers according to color then a template would be laser cut for each layer. Preferably, only around eight colors would be used. The painting would not be thicker than a traditional painting or by choice an impasto painting. The paint consistency would be that of oil paint sticks but in long filaments which would be wax coated to keep the extrusion lines clean.

When the robot traces a hologram that was originally a solid object, first a hologram is printed onto holographic film and the steps of how to make a hologram are detailed herein. The laser light shines through the holographic film displaying the hologram and the sensitive IR light sensor perceives this as a 3D solid object so it always starts printing at the base glass, and the microcontroller tells the robot that a solid object has a solid base so the robot traces the periphery of the hologram moving for example from left to right until it fills the bottom layer then it traces the outer periphery of the sides of the object beginning at the lowest point where it now touches extruded plastic or other viscous material so it prints the new line supported by the previously extruded line. The robot has a touch sensor. The robot traces the outer periphery then the light sensor and extrusion nozzle at the end of the robotic arm move upward to print the next line always continuing to print plastic with line touching line using the previous line as structural support. This process is repeated until the very top of the hologram is printed. The touch sensor tells the robot if a line has been printed or not so that no areas to be printed are skipped and no areas are printed twice.

The robot does not need computer micromanagement for printing, the robot is moving mostly by following the IR light sensor. The IR light sensor traces the IR light directly ahead of it never beneath it so that the robot never blocks the light beam from the view of its sensors. By the use of stop sticks, the robot, which is on wheels, never sits between the IR light source and the hologram. The robot has multi-axis movement and reaches into the stop stick area with a robotic arm. When the robot needs to print something intricately complex, it has microcontrollers to help it but the programming remains surprisingly simple.

The robot will also easily print layer-by-layer beginning with an object drawn in layers using a CAD program or drawn in layers in a computer art program, such as Adobe Illustrator or Corel Draw or many other software programs that use layers. The robot needs little preparation because each layer of drawing is laser cut into a metal template and the template is placed into a template holder directly in front of the IR light of an IR lamp. The metal template is laser cut guided by computer software, and the computer generated image layers, which are cut into templates, can be transferred to the laser cutter.

In front of the template is a projector lens to adjust the IR light projection to the size desired. The IR light is projected straight down through the template openings onto the base glass and the robot traces while printing as it follows the IR light of the template in the template holder. The templates should always be numbered and must be placed in correct sequence for the robot to print layer by layer.

The template fits snuggly into the template holder so it is perfectly aligned for each layer. As the robot traces while printing, it could start for example from the left side of the template and work line by line to the right, the incremental progression prevents skipping part of a pattern or filling part of a pattern twice.

The touch sensor on the robotic arm tells the robot which lines have been printed, and the base of the robot has a touch sensor as well to prevent running into the extruded material. The nozzle tip is an exchangeable tip so that the extruded material can be as narrow as a fine pen line or go up to a wide stream depending on the nozzle chosen. When clay is extruded, a nozzle which removes air bubbles is used.

If an image has an open area or area where IR light is absent, the extrusion nozzle closes and when the IR light resumes the nozzle opens. The robot has a sensor that prevents it from falling off of the table. The clarity of laser light is best in total darkness so this is the best work environment for the robot.

Advantages of this multi axis 3D printer are that it traces IR light while printing plastic or a viscous material and the robot does not need computer micromanagement for printing, the robot is moving mostly by tracing IR light while extruding plastic or other viscous material.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An additive manufacturing device comprising:
a material supply;
a robot;
a printing head coupled to a distal end of said robot and configured to receive printing material from said material supply;
an infrared (IR) holographic device configured to generate a targeting hologram;
an IR sensor; and
a controller coupled to said robot, said printing head, said IR holographic device, and said IR sensor, said controller configured to cause said printing head to dispense said printing material to form an object based upon the targeting hologram.

2. The additive manufacturing device of claim 1 wherein said controller is configured to cause said printing head to trace the targeting hologram.

3. The additive manufacturing device of claim 1 wherein said IR holographic device comprises at least one holographic plate, and an IR source configured to emit IR radiation through said at least one holographic plate to generate the targeting hologram.

4. The additive manufacturing device of claim 3 wherein said at least one holographic plate comprises a plurality of holographic plates; and wherein said IR source is configured to emit the IR radiation through a given holographic plate to generate a given layer of the targeting hologram, the targeting hologram comprising a plurality of layers.

5. The additive manufacturing device of claim 3 wherein said IR source comprises an IR laser source.

6. The additive manufacturing device of claim 1 wherein the printing material comprises IR reflective pigment.

7. The additive manufacturing device of claim 1 wherein said controller is configured to cause said printing head to trace the targeting hologram in a layer-by-layer fashion.

8. The additive manufacturing device of claim 1 wherein said controller is configured to cause said printing head to trace the targeting hologram from a bottom layer upward.

9. The additive manufacturing device of claim 1 wherein the targeting hologram represents a three-dimensional model of the object.

10. An additive manufacturing device comprising:
a material supply;
a robot;
a printing head coupled to a distal end of said robot and configured to receive printing material from said material supply;
an infrared (IR) holographic device comprising
at least one holographic plate, and
an IR source configured to emit IR radiation through said at least one holographic plate to generate a targeting hologram;
an IR sensor; and
a controller coupled to said robot, said printing head, said IR holographic device, and said IR sensor, said controller configured to
cause said printing head to trace the targeting hologram, and
cause said printing head to dispense said printing material to form an object based upon the targeting hologram.

11. The additive manufacturing device of claim 10 wherein said at least one holographic plate comprises a plurality of holographic plates; and wherein said IR source is configured to emit the IR radiation through a given holographic plate to generate a given layer of the targeting hologram, the targeting hologram comprising a plurality of layers.

12. The additive manufacturing device of claim 10 wherein said IR source comprises an IR laser source.

13. The additive manufacturing device of claim 10 wherein the printing material comprises IR reflective pigment.

14. The additive manufacturing device of claim 10 wherein said controller is configured to cause said printing head to trace the targeting hologram in a layer-by-layer fashion.

15. The additive manufacturing device of claim 10 wherein said controller is configured to cause said printing head to trace the targeting hologram from a bottom layer upward.

16. The additive manufacturing device of claim 10 wherein the targeting hologram represents a three-dimensional model of the object.

17. A method for operating an additive manufacturing device comprising a material supply, a robot, a printing head coupled to a distal end of the robot and configured to receive printing material from the material supply, an infrared (IR) holographic device configured to generate a targeting hologram, an IR sensor, and a controller coupled to the robot, the printing head, the IR holographic device, and the IR sensor, the method comprising:
causing the printing head to dispense the printing material to form an object based upon the targeting hologram.

18. The method of claim 17 further comprising causing the printing head to trace the targeting hologram.

19. The method of claim 17 wherein the IR holographic device comprises at least one holographic plate; and further comprising operating an IR source to emit IR radiation through the at least one holographic plate to generate the targeting hologram.

20. The method of claim 19 wherein the at least one holographic plate comprises a plurality of holographic plates; and further comprising operating the IR source to emit the IR radiation through a given holographic plate to generate a given layer of the targeting hologram, the targeting hologram comprising a plurality of layers.

* * * * *